A. H. STRAMPE AND J. H. STRAHMANN.
FLYTRAP.
APPLICATION FILED FEB. 9, 1917.
1,359,930.
Patented Nov. 23, 1920.
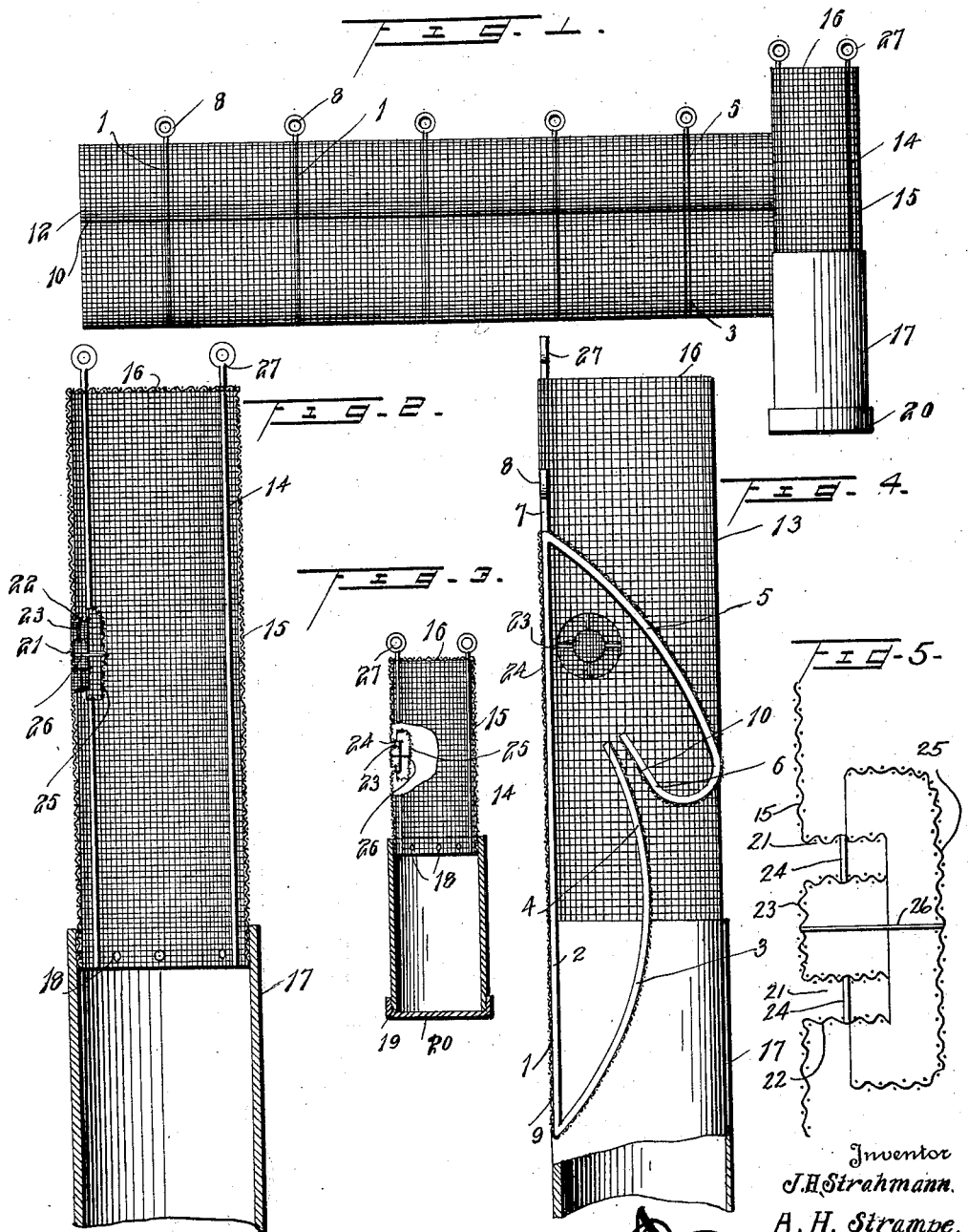

UNITED STATES PATENT OFFICE.

ARTHUR H. STRAMPE AND JOHN H. STRAHMANN, OF PAULLINA, IOWA.

FLYTRAP.

1,359,930. Specification of Letters Patent. Patented Nov. 23, 1920.

Application filed February 9, 1917. Serial No. 147,616.

*To all whom it may concern:*

Be it known that we, ARTHUR H. STRAMPE and JOHN H. STRAHMANN, citizens of the United States, residing at Paullina, in the county of O'Brien and State of Iowa, have invented certain new and useful Improvements in Flytraps; and we do hereby declare the following to be a full, clear, and exact description of the invention, such as will enable others skilled in the art to which it appertains to make and use the same.

This invention relates to improvements in fly traps.

The object of this invention is the provision of a fly trap constructed of reticulated material having a depending tube associated therewith into which the flies finally crawl and are confined.

A further object of this invention is the provision of a device of the above stated character which is designed especially for use in show-windows and like places and which is provided with means to permit the same to be conveniently suspended or supported at desired points to catch the flies and also provided with means whereby the device can be emptied when desired.

A still further object of this invention is the provision of a trap of this character, which will be simple, practical and comparatively inexpensive in construction and one that can be manufactured and sold at a low cost.

With these and other objects in view, the invention consists of the novel combination and arrangement of parts hereinafter more fully described and set forth in the claims hereto appended.

In the drawing:

Figure 1 is a front elevation of our improved fly trap as made in accordance with this invention, Fig. 2 is a vertical sectional view through the tube illustrating its construction, Fig. 3 is a similar view partly broken away to illustrate the means in which cup-shaped baffles are positioned therein, Fig. 4 is a sectional view into the body of the trap looking toward the tube.

Fig. 5 is an enlarged detail view illustrating the manner in which the cup-shaped baffles are positioned in the opening.

Like numerals of reference designate corresponding parts in all the figures of the drawings.

Referring more particularly to the drawings, the numeral 1 designates a plurality of relatively spaced flat metal bars, which comprise the vertical back members 2 which members have their lower ends curved upwardly and outwardly as at 3 and the extreme ends curved inwardly as at 4 and terminating in a spaced relation with the back members 2. The upper ends of the vertical back members 2 incline downwardly and outwardly as at 5 and their extreme lower ends are curved inwardly and upwardly as at 6, the upwardly curved portion being parallel with the member 4 and the portion 3 and in spaced relation thereto, the purpose of which will be hereinafter more fully described.

The vertical members 2 of each of the bars 1 are provided with extensions 7, which have their upper ends terminating in supporting eyes 8.

The members or supporting bars 1 are arranged at a spaced distance apart and have secured thereto reticulated material 9, which forms the body of the trap. The reticulated material is secured to the outer surface of the bars and terminates on the ends 4 and 6 of the bars, thus providing an inlet opening 10, which permits the flies to crawl into the body of the trap, which is formed by securing the reticulated material to the bars 1.

The extensions 7 and eyes 8 extend upwardly beyond the reticulated material, thus constituting supporting eyes for the suspending of the trap in a show window or the like. One end of the trap is fully closed as at 12 and its opposite end is open and is connected to a cylindrical tube 13.

The cylindrical tube 13 comprises a flat base supporting bar 14 on which is secured a foraminous body 15, the upper end of the body 15 is closed as at 16 and its lower end is fully open and has secured thereto the tube 17, which tube is constructed of any suitable material and is secured to the lower open end of the foraminous body 15 by suitable rivets 18 or any other fastening means suitable for the purpose. The lower open end of the foraminous cylindrical body 15 is secured to the upper open end of the tube 17 on the interior thereof, as shown in Fig. 2 of the drawings.

The lower open end of the tube 17 is screw-threaded as at 19 and provided with a removable closure 20, so as to permit the flies in the tube to be readily removed therefrom.

The foraminous body 15 is secured to the open end of the body 9 and communicates therewith and is provided with an opening 21, which has its walls turned inwardly as at 22 to provide an annular flange, the purpose of which will be hereinafter more fully described.

A reticulated cup-shaped body 23 is supported within the opening by a plurality of spaced supporting wires 24 which have one end secured to the peripheral edge of the body 23 and their opposite ends are secured to the inwardly extending annular flange 22, thus supporting the cup-shaped foraminous body 23 within the opening 21 formed in the tube 15 to permit the flies to crawl from the body 9 into the tube 15, and then drop into the tube 17.

A second cup-shaped member 25 formed of any suitable reticulated material and of a diameter larger than the annular flange 22 is positioned within the tube 15 and has its peripheral edge overlying the flange 21 and in spaced relation thereto and is supported in its position by a rod 26, which has one end secured to its central portion in the concave face thereof and has its opposite end connected to the concave face of the member 23 centrally thereof as shown in Fig. 3 of the drawings, thus supporting the members 23 and 25 within the opening in the tube 15 thus establishing a communication between the tube 15 and body 9 and the trap.

The upper ends of the rods 14 extend upwardly beyond the closed end 16 of the tube 15 and terminate in supporting eyes 27 so as to coöperate with the eyes 8 of the bars 1 of the main body of the trap in supporting the device in a show window or the like.

In operation, the trap is supported in a show window by suspending the same by suitable flexible elements connected to the eyes 8 and 27 in the rods 1 and 14, the flies crawl into the main body through the opening 10 which is provided by spacing the portions 6 and 4 formed by the curved portions of the bars 1, they crawl along the body through the openings into the tube 15 and then drop into the tube 17 where they are removed by removing the removable closure 20 on the lower end of the tube.

What is claimed is:

1. In a device of the class described, a fly trap comprising a body having an opening therein, an annular flange extending around the edge of the opening, a cup-shaped member positioned in the opening and spaced from the flange, and a second relatively large oppositely disposed cup-shaped member positioned over the flange and arranged in spaced relation thereto.

2. A fly trap comprising a plurality of spaced vertically disposed bars having their lower ends curved upwardly, outwardly and inwardly and terminating in spaced relation to the vertical portions, said bars having their upper ends curved downwardly, outwardly and inwardly and terminating in parallel spaced relation to the lower ends, foraminous material secured to said bars to define a horizontal container and said material terminating at the ends of said bars to form an entrance, and a vertical container secured to one end of the horizontal container and having communication with the interior thereof to receive flies.

In testimony whereof we affix our signatures in presence of two witnesses.

ARTHUR H. STRAMPE.
JOHN H. STRAHMANN.

Witnesses:
OTTO J. STRAMPE,
MARION A. MURAT.